US012706233B2

(12) United States Patent
Andersson et al.

(10) Patent No.: US 12,706,233 B2
(45) Date of Patent: Aug. 11, 2026

(54) ELECTRICAL CABLE AND MANUFACTURING THEREOF

(71) Applicant: Habia Cable Aktiebolag, Upplands Väsby (SE)

(72) Inventors: Richard L. Andersson, Kista (SE); Magnus Israelsson, Åkersberga (SE); René Suchantke, Hoppegarten (DE)

(73) Assignee: Habia Cable Aktiebolag, Upplands Väsby (SE)

(*) Notice: Subject to any disclaimer, the term of this patent is extended or adjusted under 35 U.S.C. 154(b) by 176 days.

(21) Appl. No.: 18/689,765

(22) PCT Filed: Sep. 7, 2022

(86) PCT No.: PCT/SE2022/050796
§ 371 (c)(1),
(2) Date: Mar. 6, 2024

(87) PCT Pub. No.: WO2023/038564
PCT Pub. Date: Mar. 16, 2023

(65) Prior Publication Data

US 2024/0420871 A1 Dec. 19, 2024

(30) Foreign Application Priority Data

Sep. 8, 2021 (SE) .................................... 2130241-9

(51) Int. Cl.
*H01B 5/08* (2006.01)
*H01B 7/02* (2006.01)
(Continued)

(52) U.S. Cl.
CPC ............... *H01B 9/027* (2013.01); *H01B 7/02* (2013.01); *H01B 7/303* (2013.01); *H01B 9/006* (2013.01)

(58) Field of Classification Search
CPC ............. H01B 5/08; H01B 7/30; H01B 9/027
See application file for complete search history.

(56) References Cited

U.S. PATENT DOCUMENTS 3,660,592 A * 5/1972 Anderson .............. H01B 3/004
174/106 SC
4,549,042 A 10/1985 Akiba et al.
(Continued)

FOREIGN PATENT DOCUMENTS

CH 704993 A1 11/2012

*Primary Examiner* — Chau N Nguyen
(74) *Attorney, Agent, or Firm* — Capitol City TechLaw

(57) ABSTRACT

Low-loss lightweight high-power kilohertz alternating-current high-voltage electrical cables 1 usable in low pressure having a bundle 2 of metallic wires 3 being separated from each other by non-conductor layers 4 provided on the individual metallic wires, wherein the metallic wires 3 alternate between outer positions 5 and inner positions 6 in the bundle along a longitudinal extension 7 of the electrical cable in order to counteract skin effect in the electrical cable bundle 2, as well as enabling counteraction of proximity effect, when in use, an inner semi-conductive layer 8 of broad range temperature rated polymeric material surrounding said bundle 2 of metallic wires 3, and an insulating layer 9 of broad range temperature rated polymeric material surrounding and bonded to the inner semi-conductive layer 5, at least one of the metallic wires 3 being in electric contact with the inner semi-conductive layer 8 as well as a manufacturing method.

21 Claims, 7 Drawing Sheets

(51) Int. Cl.

| | |
|---|---|
| ***H01B 7/30*** | (2006.01) |
| ***H01B 9/00*** | (2006.01) |
| ***H01B 9/02*** | (2006.01) |

(56) References Cited

U.S. PATENT DOCUMENTS

| | | | | |
|---|---|---|---|---|
| 4,564,723 | A * | 1/1986 | Lang | H01B 11/1058 174/115 |
| 7,507,904 | B2 * | 3/2009 | Naas | H01B 7/0861 174/113 R |
| 9,818,501 | B2 * | 11/2017 | Elie | H01B 1/026 |
| 10,290,392 | B2 * | 5/2019 | Green | H01B 9/006 |
| 2003/0141101 | A1 * | 7/2003 | Mima | H01B 7/306 174/128.1 |
| 2008/0136551 | A1 * | 6/2008 | Phillips | H01F 17/0006 174/128.1 |
| 2014/0345905 | A1 * | 11/2014 | Morice | H01B 13/0016 174/113 R |
| 2020/0161020 | A1 | 5/2020 | Hahner et al. | |

* cited by examiner

ELECTRICAL CABLE AND MANUFACTURING THEREOF

This application claims priority under 35 USC 119 (a)-(d) to SE patent application No. 2130241-9, which was filed on Sep. 8, 2021, the entire contents of which are incorporated herein by reference.

BACKGROUND

The invention relates to lightweight high-power kilohertz alternating-current high-voltage electrical cables usable in low pressure, which also has high toleration of resistive heat generation and low resistive losses relative to power capacity. The invention also relates to a manufacturing method for such cables.

There are technical development trends towards electric vehicles (on land), electric shipping (on water), and electric aviation (in air and space). In these areas, particularly in electric aviation, there is a need of electrical cables that are lightweight and capable of conveying high power while withstanding a high continuous thermal energy generation in the cables. It is conceivable in all these areas to use variable frequency drives, that is, certain types of motor drives used in electro-mechanical drive systems for controlling electric motor speed and torque by varying electric motor input frequency and voltage. Variable frequency drives are useable for asynchronous induction motors as well as all types of synchronous motors.

In using a variable frequency drive in combination with an electric motor for propelling an aircraft (or other technically comparable means according to the foregoing, a technical challenge would be to transmit electric power at megawatt level from a power source to the electric motor via a variable frequency drive. The output voltage from the drive could be above 400 V, for instance, up to 10 kV, the current above 1000 A, and the frequency up to 5 kHz (plausibly even up to 15 kV and 10 KHz). This would require megawatt-class electrical cables. Conductors and insulation of an electrical cable conveying these levels of power and voltage between the power source and the electric motor would be subject to risk of partial discharge due to the high voltages, to lower than sea-level air pressure (at several hundred through several thousands of meters above sea-level), and to potentially destructive heat generation due to resulting resistive losses caused by the cable's alternating current resistance. Assuming the aircraft would reach a high altitude, that is, a low-pressure environment (in a low sub-range of non-sea-level pressure), the risk of partial discharge would increase further due to lower gas density within and around the cable itself. Air-cooling of the electrical cable is also likely to become more difficult at high altitude due to low density of air surrounding the cable. It should be noted that while partial discharges tend to damage materials (such as on the inside, outside, or within the insulation) of the cable, the partial discharges as such only occur in gases (including any air pockets). Hence, it would not occur within insulation materials or other solid materials of the cable, but within any air-gaps adjacent to or within such materials.

Solutions directed towards electrical cables resistant to partial discharges is known in the prior art. For instance, a single-phase electrical cable design is known having a bundle of electrical wires in conductive electric contact with each other, and at the bundle's periphery, with an inside of a semi-conductive layer located on the inside of an insulating sheath. Problems related to alternating current resistive losses, being skin effect or proximity effect are not solved thereby. These tend to be pronounced at higher frequencies, such as in the kilohertz range and above, in large total conductor cross-sections, as necessary for technical applications contemplated in this disclosure, and typical conductor materials such as copper. Further, there are known cables having insulating and semi-conductive materials with high temperature ratings that will tolerate a high temperature when in use.

One approach in reducing weight in an AC electrical cable could be to use the conductors of the cable with particular efficiency. So-called litz wires are well-known in AC applications for their ability to mitigate skin effect and (in case of two or more nearby wires) proximity effect. These effects generally work against efficient use of the available conductors (conducting material) of an AC cable. Through specific twisting of their electrical conductors, these electrical cables make particularly efficient use of the conductor cross section even at high frequencies, most commonly in the radio frequency range. Litz wires have a plurality of relatively thin electrical conductors, each having individual insulation (such as an enamel coating) to insulate it from the other electrical conductors of the cable, except at junctions such as connectors. Litz wires are often used in proximity of other litz wires and can then be commonly referred to as multi-phase cables. Litz wires seem to have been used in the past in low or relatively low-voltage applications, although many variants and different uses of this cable species have possibly occurred in the past. In view of the design inherent in a litz cable, that is, individually insulated conductors surrounded by air, its use for high-voltage applications would involve a risk of partial discharge in at least some of the insulation of the cable, especially at high altitude (low pressure).

There are solutions promoted in the prior art, in accordance with the above, which provide protection in an electrical cable against partial-discharge in combination with heat tolerance. There are distinctly different solutions, which exhibit relatively low resistive heat generation by addressing problems relating to skin effect and proximity effect in the electrical cables.

Regardless of any recent technology trends or advancements, there has long been an unfulfilled demand in, for instance, electric means of transportation for electrical cables that combine lightweight and high-power capabilities efficient at kilohertz frequencies with high-voltage capabilities in non-sea-level pressure (significantly below sea-level atmospheric pressure at altitudes indicated above and even approaching zero pressure) environments, resilience to heat, and reduced heat generation.

Yet, the prior art does not disclose or suggest any electrical cables efficiently combining all of the essential properties identified in the introduction.

SUMMARY OF INVENTION

As conventions when referring to the invention herein, a bundle (of metallic wires) means all metallic wires (and their constituents) in a (single-phase) cable, while a metallic wire consists of single or multiple metallic strands (solid wire or stranded wire respectively). A wire consists of one metallic strand or several metallic strands. A metallic strand is a long cylinder of metal. If a metallic wire consists of a single metallic strand, then that single metallic strand will be coated with non-conductor layer. If a metallic wire consists of several metallic strands, then all metallic strands will be in conductive contact with each other, and around them will be one layer of non-conductor coating. A group of metallic wires means a subset of the metallic wires in the bundle.

The single-phase cable, bundle, wires, strands, and groups are generally of cylindrical shape (possibly compressed to reduce the size of the cable). The metallic wires and metallic strands should be interpreted as made of conductive material generally, although metals are preferred as conductive materials therein.

The invention aims to overcome or alleviate the limitations in prior art solutions by providing a single-phase electrical cable, which has lightweight, high-power, kilohertz alternating current, high-voltage, low pressure usability characteristics, which also has high toleration of resistive heat generation and low resistive losses, comprising: a bundle of metallic wires; the metallic wires being separated from each other by non-conductor layers provided on at least a majority of the individual metallic wires; the metallic wires being woven in a configuration such that each of the metallic wires alternates between outer positions and inner positions in the bundle along a longitudinal extension of the electrical cable in order to counteract skin effect in the bundle, when in use; an inner semi-conductive layer of broad range temperature rated polymeric material surrounding said bundle of metallic wires; at least one of the metallic wires being in electric contact with the inner semi-conductive layer (to counteract partial discharge, when in use); an (high-voltage) insulating layer of broad range temperature rated polymeric material surrounding and bonded to the inner semi-conductive layer.

This cable very efficiently combines the properties described above and allows for variants to enhance its performance further.

Plausibly for a majority of technical applications, to mitigate proximity effect in case this single-phase electrical cable is located nearby another conductor (such as a return cable) with which it forms an electric circuit (or for other reasons, such as mechanical ones), the cable would have its metallic wires woven in a configuration such that each of the metallic wires alternates between lateral positions on opposed sides of the bundle along the longitudinal extension of the electrical cable. In particular, the woven configuration could be such that each of the metallic wires alternate between the lateral positions on opposed sides of a center of the bundle, so as to form a diametrically even distribution of the metallic wires relative to the center of the bundle. This would be a particularly efficient way of mitigating proximity effect.

For purposes of mitigating skin effect and, as applicable, proximity effect as well as for ease of manufacturing, the bundle could be made up of multiple groups of the metallic wires, wherein the metallic wires of each group are mutually twisted and the groups also being mutually twisted. This would be the same as or functionally similar to a conductor layout in conventional litz wires with accompanying beneficial properties thereof and more.

Optionally, at least one of the metallic wires of each of at least two groups is in electric contact with the inner semi-conductive layer, on an inside surface thereof, through electric contact by the metallic material of the wire resting (intermittently, taken in the cable's longitudinal direction, due to the twisting or weaving) against the semi-conductive material of the inner semi-conductive layer. This electric contact would ensure that partial discharge is eliminated in the cable. These contact-making metallic wires should generally avoid contact with other metallic wires of the same group or metallic wires of other groups. Yet, for securing counteraction of partial discharge, a relatively high number of contact-making metallic wires is preferable. In one preferable configuration, there would be only one bare (no non-conductor layer thereon) contact-making metallic wire of every other (taken around a periphery on the inside of the inner semi-conductive) group of metallic wires (if an odd number of groups along this periphery, skip contact-making metallic wire in two of the groups adjacent to each other). The above is generally applicable even if the bundle consist of only one group of metallic wires.

One way of attaining this electric contact between at least one of the metallic wires and the inner semi-conductive layer is by providing an electrically insulating non-conductor layer with openings therein at a physical interface between an inner surface of said inner semi-conductive layer and metallic wires of said bundle. This way, the electric contact would be ensured, while maintaining at other locations the mutually insulated relation between the wires in the bundle and, thus the mitigation of at least the skin effect.

The electrical contact discussed above is to be understood as implying physical contact, although not necessarily continuous, between the metallic wire(s) and an inside of the inner semi-conductive layer.

Another inventive way of attaining this electric contact between at least one of the metallic wires and the inner semi-conductive layer is by providing semi-conductive properties in the non-conductor layer at a physical interface between said inner surface of said inner semi-conductive layer and metallic wires of said bundle. The semi-conductive properties need to provide enough conduction for elimination of the risk of partial discharge within intended operating conditions of the electrical cable and, at the same time provide enough insulation for the wires to maintain a negligible contribution to the skin effect.

As the electrical cable is intended for alternating current, in a general case, electric capacitive coupling through the non-conductor layer of the metallic wires also contributes to the electric contact between the metallic wires and the inner semi-conductive layer. Another inventive way of attaining a satisfactory electrical contact between the at least one metallic wire, or rather all of or a majority of the metallic wires as we would be seeking to form collectively a high capacitance, and the inner semi-conductive layer is to provide non-conductor layers made of insulating material. These non-conductor layers should have small enough thickness to render the capacitance between the metallic wires and inner semi-conductive layer dominant over, that is, larger or much larger than a capacitance of the insulating layer of the cable between the inner semi-conductive layer and the surroundings of the electrical cable (which can be constituted in this regard by an outer semi-conductive layer, see below, and is to be regarded as having zero or ground potential). A resulting voltage division over these capacitances needs to provide a voltage difference between the metallic wires and the inner non-conductor layer consistently well and securely below 327 V in operation of the electrical cable, where 327 V is the lowest voltage that may lead to partial discharge in small air gaps.

Thus, in relation to at least any of claims 1-4, the inventive electrical cable could comprise alternatively: said electric contact between the metallic wires and the inner semi-conductive layer being provided in operation by a majority of the non-conductor layers being made of electrically insulating material and exhibiting thicknesses small enough to render larger a first capacitance collectively formed between said majority of the metallic wires and said inner semi-conductive layer than a second capacitance formed between the inner semi-conductive layer and an outside of the insulating layer of the electrical cable, wherein, optionally, the outside of the insulating layer is formed by an outer semi-conductive layer. Preferably, the first capacitance is at least two times the second capacitance.

Preferably, based on a favorable performance-to-weight ratio, each metallic wire being made of copper or aluminum alloy and the non-conductor layer being made of an insulating material having, where applicable, an additive of non-insulating material (to become semi-conductive). It is anticipated that, in case of aluminum alloy, an aluminum oxide outer layer on the wire could advantageously serve as the non-conductor layer, whereas copper alloy (possibly with silver plating) would have a non-conductor/semi-conductive coating. Note also in the inventive context that capacitive coupling existing between the metallic wires and the inner semi-conductive layer to some extent contributes to counteracting partial discharge.

Optionally, each of the metallic wires is made up of multiple metallic strands. This arrangement has the potential of providing an improved flexibility of the cable. Each metallic strand could be individually provided with a plating, such as in the case of tinned copper strands.

Optionally, the electrical cable has a central non-conductive core inside said bundle of metallic wires. Assuming the same conductor cross section compared to a cable without a core, this would bring the benefit of a larger outer diameter of the cable and, thus, a larger area for dissipating heat. Further, the twisting or weaving of the metallic wires would be less difficult to attain. Such a non-conductive core could also be formed as a cooling duct providing a path for a cooling agent such as gas (e.g., air) or a liquid (e.g., oil), in order to cool the electrical cable. Several cooling ducts integrated in the bundle are also envisioned.

The invention is advantageously applied in a combination of at least two single-phase cables within a common protective jacket, constituting a multi-phase electrical cable. The weaving or twisting would then be adapted to attain counteraction of proximity effect.

In order to make efficient use of the available conductors of the cable, when in use, each metallic wire having a diameter less than a factor times a skin depth for the alternating current, said factor being selected as K/(N^0.25), wherein 2<K<3 and N is the total number of metallic wires in the bundle. The preference, however, would be the factor K being close to or equal to 2.

The invention also relates to the manufacturing of the inventive electrical cable, which would involve: selecting a wire material for the conductive wires; selecting an operational frequency of alternating current to be conveyed by said electrical cable; based on the selected material and the selected operational frequency, selecting (103) a nominal maximum diameter of said conductive wires, when in use, being less than a factor times a skin depth for the alternating current in the metallic wires at the operational frequency for the wire material, said factor being selected as K/(N^0.25), wherein 2<K<3 and N is the total number of metallic wires in the bundle; preparing said electrical cable; and, optionally, applying an identifier to the electrical cable being an indicator, externally of said electrical cable, of said operational frequency. The operational frequency should be selected as a frequency (preferably the highest fundamental frequency) to be conveyed by the electrical cable and preferably a frequency at which counteraction of detrimental effects on the cable performance are pronounced. A frequency range could be used to indicate the operational frequency.

These definitions shall be used in the interpretation of this disclosure:

insulating material implies conductivity $<10^{-9}$ S/m;
non-conductor material implies conductivity $<10^{5}$ S/m;
semi-conductive material implies conductivity of $10^{-4}$ through $10^{5}$ S/m;
metallic wire material implies conductivity $>10^{5}$ S/m;
non-insulating material implies conductive $>10^{-9}$ S/m.

An electrical wire of the inventive cable being in an outer position of a bundle of electrical wires of a single-phase electrical cable shall imply, for at least one (or one in each group) of the wires, that that wire has a surface (including a non-conductor layer where applicable) constituting (intermittently due to twisting/weaving) the outermost part of the bundle seen in a radial direction (or a geometric center-outwards direction assuming the electrical cable shape is not essentially circular) of the single-phase electrical cable, whereas an inner position not need to imply a position at the cable center of the cable. However, it is assumed that a specific wire that constitutes (intermittently) the outermost part of the bundle at one longitudinal position should also, normally, occupy (intermittently) an innermost position among metallic wires in the bundle at a different longitudinal position.

The counteraction of proximity effect depends on relative locations of at least two cables, for instance, those of the invention. The following intends to clarify definitions relating to such counteraction of proximity effect. In a particular single-phase electrical cable according to the invention, "alternation [of a wire] between lateral positions on opposed sides of the bundle" shall preferably mean alternation in relation to a rotationally fixed diameter or a diameter that rotates along the cable in relation to a current position (present or intended at a later stage) of at least one other electrical cable (or comparable structure) forming an electric circuit with the particular single-phase electrical cable. In case the single-phase electrical cable is not essentially round (although presently being a non-preferred case), "diametrically" and "diameter" should be understood as extending through a geometric center of a bundle, preferably in alignment with a transverse main axis if any. This means that counteraction of proximity effect shall be attained regardless of whether constituent cables of an inventive multi-phase cable are parallel or mutually twisted along its extension.

DETAILED DESCRIPTION OF INVENTION

Figure 1:
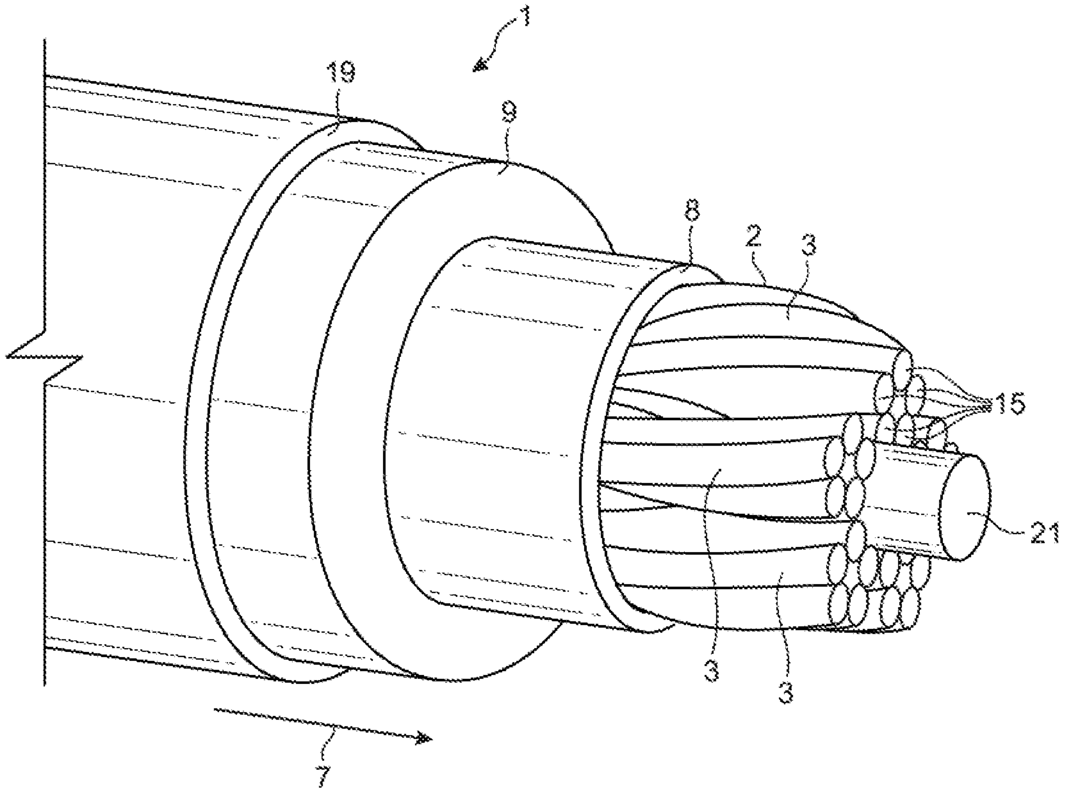
FIG. 1 shows a perspective view of a single-phase cable according to the invention, which has a bundle of mutually insulated metallic (conductive) wires grouped five by five around a non-conductive (insulator) core and a semi-conductive layer, an insulating layer, and another semi-conductive layer surrounding the bundle. There is also an indication of a longitudinal direction of the cable.

With reference to FIGS. 1, 2a, 2b, and 3a, the invention, that is, a single-phase lightweight high-power kilohertz alternating current electrical cable 1 suitable for high voltage and high (as well as low) temperature applications and normal and low-pressure environments includes a bundle 2 of metallic wires 3. These metallic wires 3 are separated from each other by non-conductor layers 4 (FIG. 3c and FIG. 3d) provided on or around at least a majority of the individual metallic wires, which are woven in a configuration such that each of the metallic wires 3 alternates between outer positions 5 and inner positions 6 in the bundle along a longitudinal extension 7 of the electrical cable 1 in order to counteract skin effect in the bundle 2, when in use. Rotation of wires around the cable center will counteract proximity effect, when in use in combination with at least one more cable (conductor) to form an electrical circuit.

Further, an inner semi-conductive layer 8 of broad range temperature rated polymeric material surrounds said bundle 2 of metallic wires 3. When possible, it is preferred to use the same type of insulating (or non-conductor or semi-conductive) material throughout all relevant layers of the cable 1 and along essentially the full length thereof (note that layers may exhibit openings or may be partially removed as explained herein). There is also an insulating layer 9 of broad range temperature rated polymeric material surrounding and bonded to the inner semi-conductive layer 8. The insulating layer 9 is surrounded by an outer semi-conductive layer 19, also made of broad range temperature rated polymeric material and bonded to the insulation. When referring to a broad range temperature rated polymeric material in this description, it should be understood to preferably include fluoropolymers (fluorinated-polymers or -copolymers: including but not limited to: PTFE, FEP, PFA, and ETFE), also Polyaryle-Ether-Ketones (PAEK) family materials (including, but not limited to PEEK), and/or also silicone materials (including also fluoro-silicones). Further, a semi-conductive property of the broad range temperature rated polymeric material is preferably created by addition of a non-insulating material. The non-insulating material is favorably selected as carbon-based particles, including but not limited to: carbon black, carbon nanotubes, and graphene.

The bundle 2 of the electrical cable 1 is made up of multiple groups, wherein the metallic wires 3 of one of the groups are indicated by 15. The metallic wires 3 of each group 15 are mutually twisted, which is a way of counteracting skin effect in the cable 1. Further, each individual group 15 is mutually twisted around the cable core 21 along the extension 7 of the cable 1, which is a way of counteracting proximity effect. As the skilled person would appreciate, exactly how this should be done will depend on the other conductor(s)/cable(s) (both design and excitation), such as a return cable (refer to cable 22 in FIG. 4), with which the cable 1 forms an electric circuit. On average along the extension 7 of the cable 1, all the metallic wires 3 must be at an essentially equal distance from the other conductor(s)/cable(s).

As part of the elimination of partial discharges in the cable 1, at least one of the metallic wires 3, preferably at least one wire of every group 15 of wires should be in electric contact with the inner semi-conductive layer 8. Seen from an individual wire 3, this contact will be intermittent along the extension 7 of the cable 1, since the wire 3 is twisted together with the other wires. However, this will be enough for bringing the semi-conductive layer 8 to essentially the same electric potential as a periphery of the bundle 2.

Figure 2A:
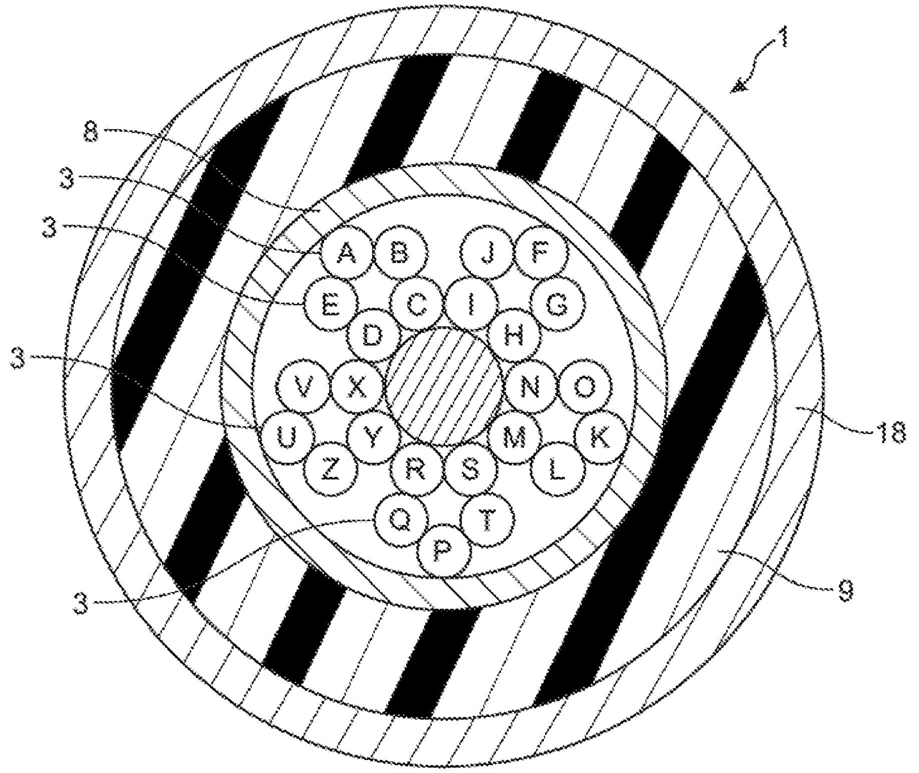
FIGS. 2*a* and 2*b*, respectively, are explanatory of the twisting of the metallic wires (an individual one being identified by a letter) and show cross-sectional views of the single-phase cable according to the invention, at separated locations along the longitudinal direction, with the layers surrounding the metallic wires having fixed rotational positions between FIGS. 2*a* and 2*b* (that is, only the wires have moved/rotated when comparing the views of FIGS. 2*a* and 2*b*). Rotations are visualized of the groups of metallic wires as well as of the metallic wires within each group.
Figure 2B:
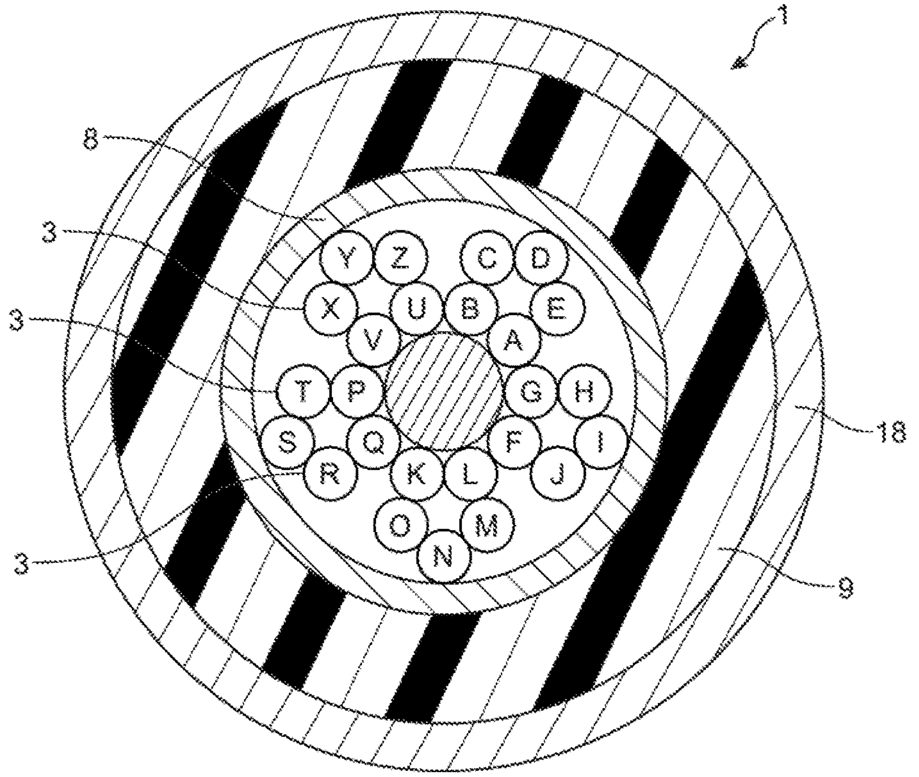

Specifically, the metallic wires 3 are woven in a configuration such that each of the metallic wires 3 alternates between lateral positions 11 on opposed sides 12, 13 of the bundle 2 along the longitudinal extension 7 of the electrical cable 1. The configuration is such that each of the metallic wires 3 alternates between the lateral positions 11 on opposed sides 12, 13 of a center 14 of the bundle 2, so as to form a diametrically even distribution of the metallic wires 3 relative to the center 14 of the bundle 2. FIGS. 2a and 2b indicate how, for instance, a group of wires marked A-B-C-D-E at one longitudinal position along the cable 1 (FIG. 2a) has reached a different rotational position (about 72 degrees clockwise) as a group at a different longitudinal position along the cable 1 (FIG. 2b). As can be seen, the group of wires marked A-B-C-D-E has also rotated around its own center between these longitudinal positions (about 216 degrees clockwise). It is highly preferable that a rotational pitch of the one of these two rotations should not be an even multiple of a rotational pitch of the other, since it is important to avoid systematically upsetting the respective average distributions between inner/outer positions (relating to skin effect) and opposed lateral positions (relating to proximity effect). The depicted electrical cable 1 has a central non-conductive core 21 inside said bundle of metallic wires 3, which may be preferable to achieve an efficient and lightweight design. As mentioned above the non-conductive core 21 could provide a path in it (not shown explicitly) for a cooling agent to pass through it to enhance dissipation of heat caused by resistive losses.

Figure 4:
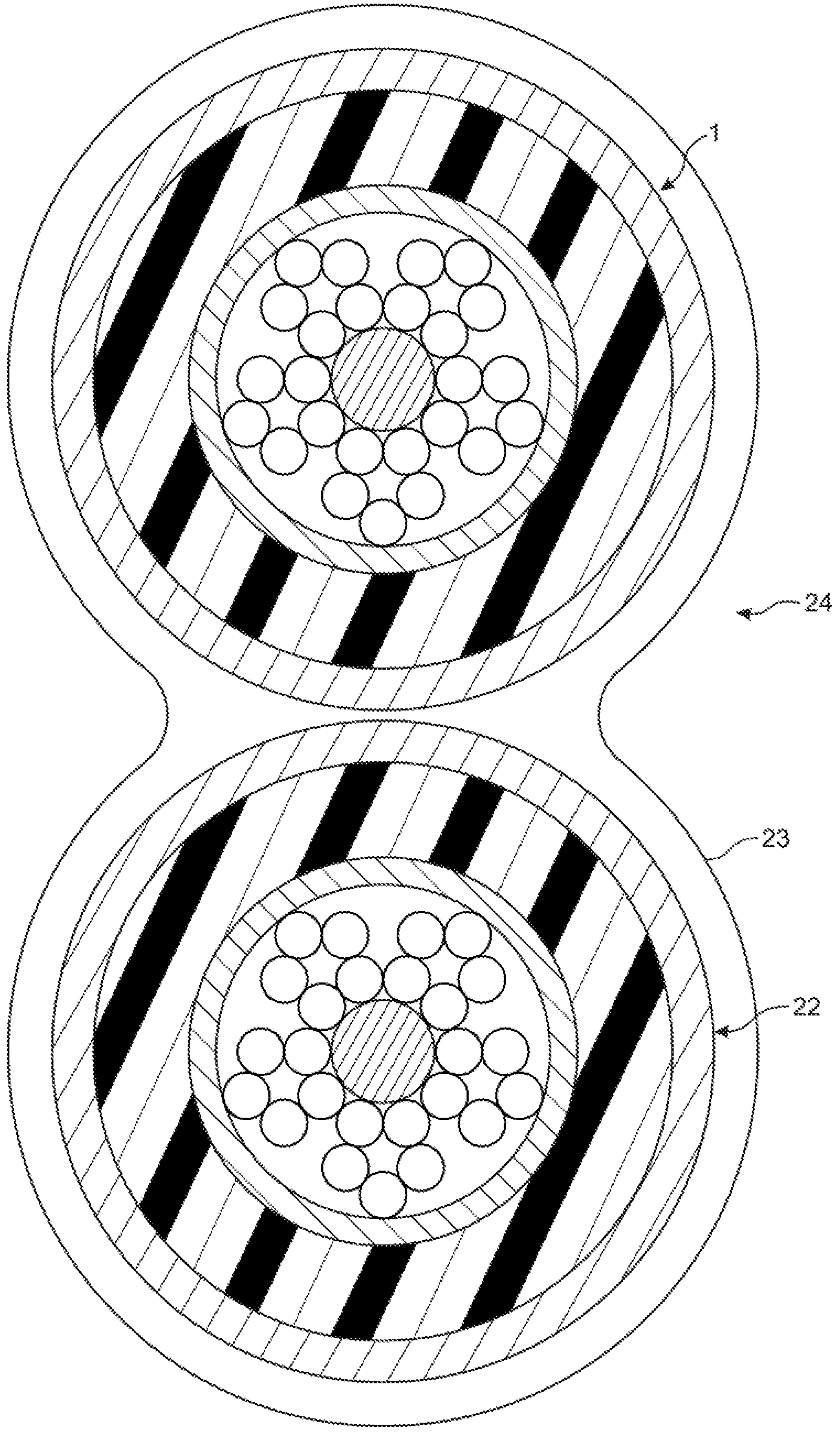
FIG. 4 shows a cross-sectional view of a multi-phase electrical cable according to the invention, in which two single-phase electrical cables according the invention are combined within a common insulating protective jacket.

FIG. 4 shows the cable 1 in combination with another, identical cable 22, within a common protective jacket 23, constituting a multi-phase electrical cable 24. Combining cables 1 and second cable 22 into a multi-phase cable 24 will generally give better control over twisting or weaving for optimal performance in relation to counteracting proximity effect. For such a multi-phase electric cable 24, counteraction of proximity effect, caused by a different conductor in a proximity of the multi-phase electrical cable 24, could potentially be improved by mutual twisting of both (or all) of the combined single-phase cables 1, 22 along a central axis of the common protective jacket 23 to suppress losses due to proximity effect caused externally. To further explain this: if one of the single-phase cables 1, 22 is always closer to, for instance, a metallic wall along the multi-phase electrical cable's extension and both (or all) single-phase electric cables 1, 22 are completely straight, this phase will have higher losses. Twisting of both (or all) single-phase electric cables 1, 22 along the central axis of the multi-phase electrical cable 24 would instead equalize (distribute equally) the losses to both (or all) single-phase electrical cables 1, 22.

Figure 3A:
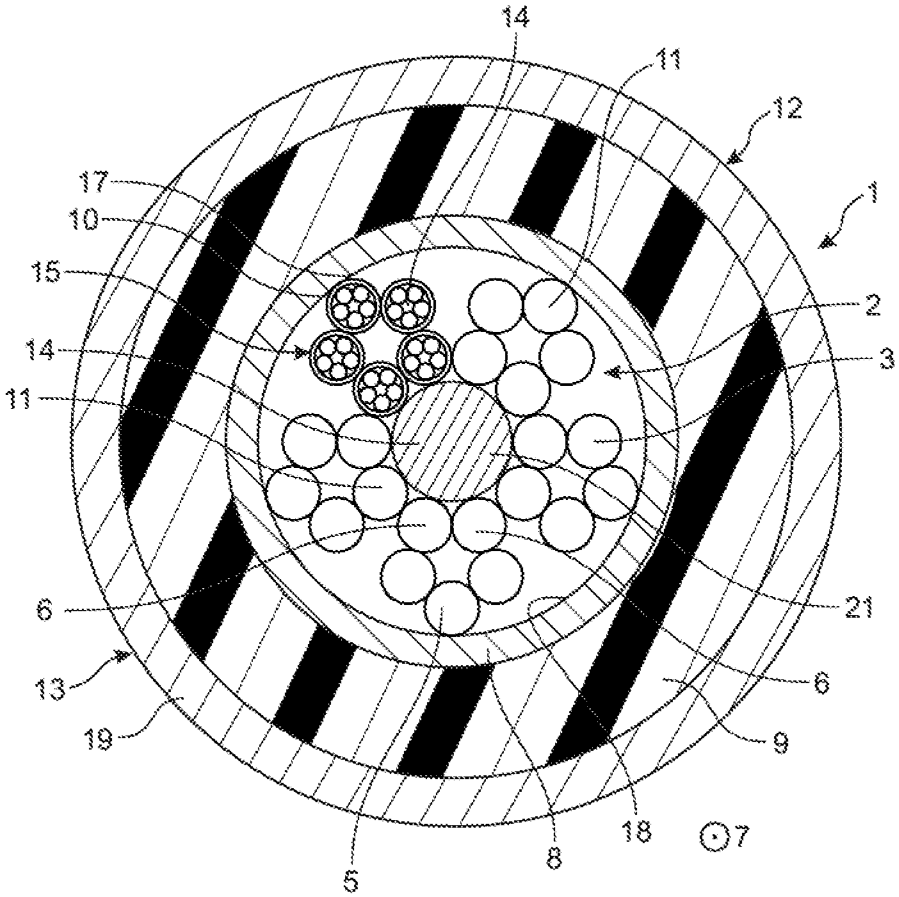
FIG. 3*a* shows again the cross-sectional view of FIG. 2*a*, but with an indication of how each group (only shown explicitly for group A-B-C-D-E in FIG. 2*a*) of five metallic wires each having a non-conductor coating and being made up of five separate strands. For simplicity, all five metallic wires of group A-B-C-D-E are shown as having identical non-conductor coatings although this will not be the case in all variants of the invention.
Figure 3B:
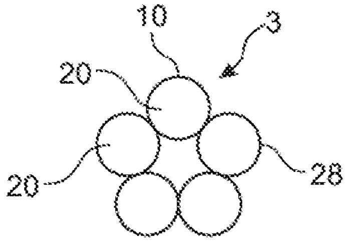
FIGS. 3b-3d show some variants for a single wire of group A-B-C-D-E of FIG. 3a including metal-plated (plating generally being too thin to be visible in cross-sectional drawings) metallic strands without (FIG. 3b), partially with (FIG. 3c) and wholly with (FIG. 3d, corresponding to what is indicated in FIG. 3a) the non-conductor coating.

With reference to FIGS. 3*b* and 3*a*, one way of establishing electric contact at electric contact point 10 between at least one of the metallic wires 3 and the inner semi-conductive layer 8 would be by omitting the non-conductor layer 4 on one electric wire in each group and thus achieve electric contacts at respective physical interfaces 17 between an inner surface 18 (of FIG. 3*a*) of said inner semi-conductive layer 8 and metallic wires 3 of said bundle 2. Note that the wire of each groups making this contact will most preferably be insulated in relation to the other wires of that group and in relation to wires of neighboring groups of wires.

Figure 3C:
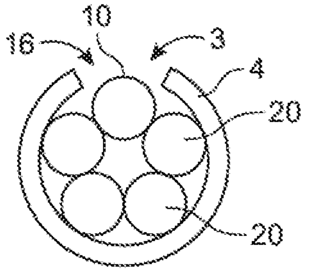

With reference to FIGS. 3*c* and 3*a*, one way of establishing electric contact at electric contact point 10 between at least one of the metallic wires 3 and the inner semi-conductive layer 8 would be by letting the non-conductor layer 4 be electrically insulating and exhibit openings 16 in the non-conductor layer at respective physical interfaces 17 between an inner surface 18 of said inner semi-conductive layer 8 and metallic wires 3 of said bundle 2. In manufacturing of the cable 1, such openings 16 could be made by removing non-conductor material once the twisting or weaving of the wires 3 is completed, for instance, through grinding, etching, or melting.

Figure 3D:
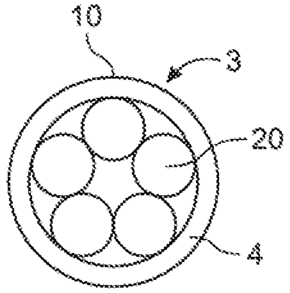

With reference to FIGS. 3*d* and 3*a*, one way of establishing electric contact at electric contact point 10 between at least one of the metallic wires 3 and the inner semi-conductive layer 8 would be by letting the non-conductor layer 4 exhibit semi-conductive properties at a physical interface 17 between said inner surface 18 of said inner semi-conductive layer 8 and metallic wires 3 of said bundle 2. For practical purposes, the whole layer 4 would preferably be of the same material.

This means that the material must be insulating enough between the wires and conductive enough to reduce a difference in the electric potential between the wires and the inner semi-conductive layer.

In FIGS. 3*b*-3*d*, as a preferred example, each wire 3 is made of copper (or copper alloy) strands 20 with tin plating 28. Alternatively, each copper strand could have an individual silver or nickel plating (not shown). Another possible wire material is aluminum alloy, in which case the non-conductor layer 4 could be prepared as aluminum oxide either by oxidization in air or further treatment. In both cases, the non-conductor layer 4 could be made of an insulating material, such as a resin. In case semi-conduction is desirable the insulating material could contain an additive of non-insulating (that is, more or less conducting) material.

Figure 5:
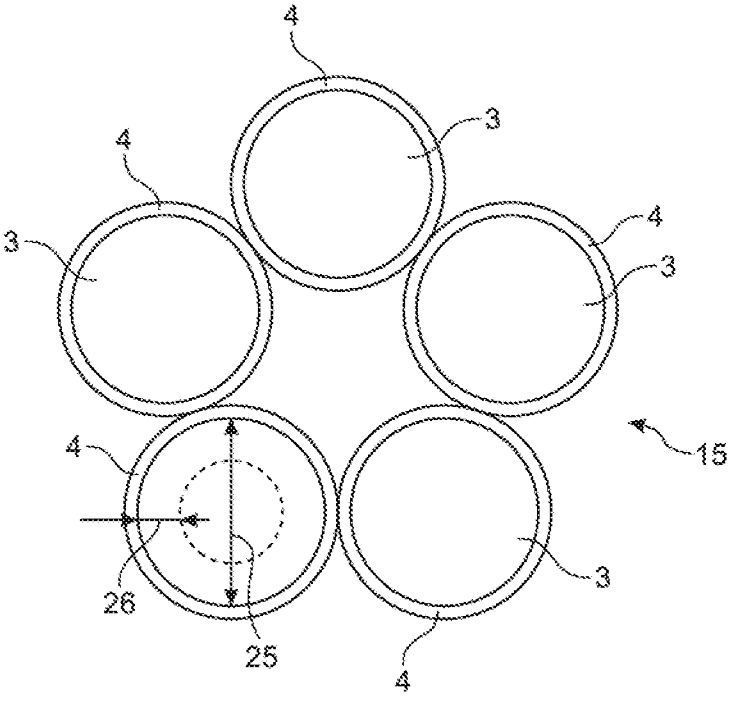
FIG. 5 shows in the group A-B-C-D-E a diameter of a single metallic wire and an indication of a skin depth of electric current in a single wire when the electric cable is in use.

FIG. 5 shows wires 3 of a group 15 of wires. Marked in one of the wires 3 are diameter 25 and skin depth 26 when the electric cable is in use. The metallic wires have a diameter (25) less than a factor times a skin depth (26) for the alternating current. This factor "F" is selected as F=K/(N^0.25), wherein 2<K<3 and N is the total number of metallic wires 3 in the bundle 2. The denotation used to express the factor means "K" divided by the divisor "N raised to the power of 0.25". Skin effect in a multi-wire conductor (N>1) will cause extra losses of up to about 10% to that of operating at zero frequency (DC), where skin and proximity effects are absent, if K is equal to 2.0, which is generally preferable in an optimized cable according to the invention. K being equal to 3.0 will give losses of up to about 50% but at the same time will require fewer total strands for a given cross section.

These are illustrating examples in the case of K=2:1 metallic wire in the bundle gives wire diameter=2×skin depth; 16 metallic wires in the bundle gives wire diameter=1×skin depth; 256 metallic wires in the bundle gives wire diameter=0.5×skin depth. The two latter examples are within the scope of the invention, while the first example is not.

Figure 6:
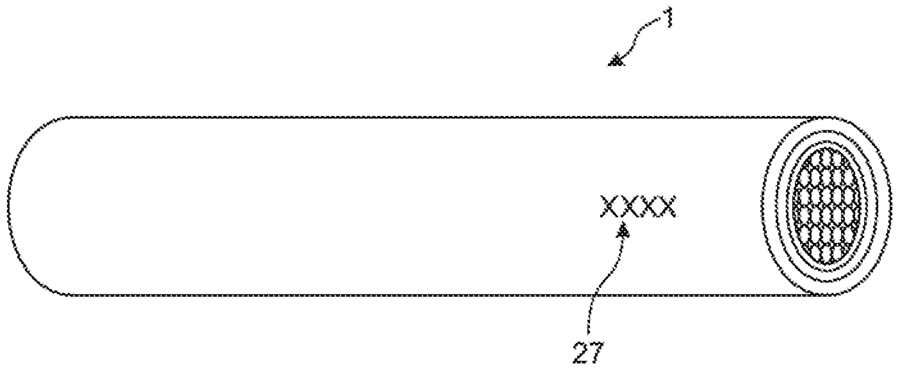
FIG. 6 shows a perspective view of a short section of the single-phase electric cable according to the invention marked with an identifier of electric properties of the cable.
Figure 7:
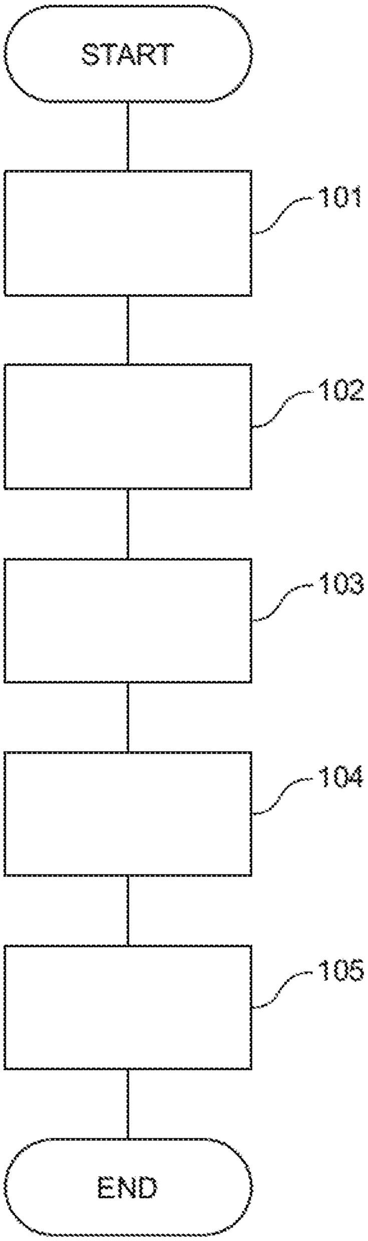
FIG. 7 shows a flow chart for the manufacturing of a cable according to the invention.

With reference to FIG. 6, showing a segment of the cable, and FIG. 7 showing a flow chart, the invention also includes a method of manufacturing of the inventive electrical cable discussed above, comprising the following steps: selecting 101 a wire material for the conductive wires; selecting 102 an operational frequency of alternating current to be conveyed by said electrical cable; based on the selected material and the selected operational frequency, selecting 103 a nominal maximum diameter of said conductive wires being less than the skin depth related factor "F" times the skin depth for the alternating current in the conductive wires at the operational frequency for the wire material; preparing 104 said electrical cable; optionally, applying 105 an identifier 27 to the electrical cable being an indicator, externally of said electrical cable, of said operational frequency. The removal of a non-conductor layer 4 (reference is made to FIG. 3*c* and related description) is another potentially essential method step in the method of manufacturing of the inventive cable. A way of twisting or weaving the electric wires is inherently part of the method.

For ease of explicability and depictability, cables of only 25 (5×5) metallic wires are shown in the drawings. However, a preferable order of magnitude for the number of metallic wires is 100 to 1000, in view of the technical applications discussed herein.

Inequalities expressed herein by the sign "<" should be understood to include "is less than or equal to".

It is currently anticipated that an inventive cable of the type disclosed herein could have a total cross-sectional conductor area of up to about 150 square millimeters when operated at up to 5 kHz due to practical limitations during manufacturing in handling thousands of metallic wires simultaneously.

In foreseen uses of the inventive electrical cable, such as in a variable frequency drive for an electric motor for propelling an aircraft or similar, it is anticipated that electrical properties relating to skin and/or proximity effects the electrical cable 1 should be optimized for conveying AC power within a frequency band defined as from 0.4 kHz and/or up to its (highest) operational frequency of 5 kHz. It is believed that a so optimized electrical cable design, and any use thereof, would even further distinguish from the prior art the present invention as defined in any of the appended claims directed towards electrical cable(s).

Figure 8:
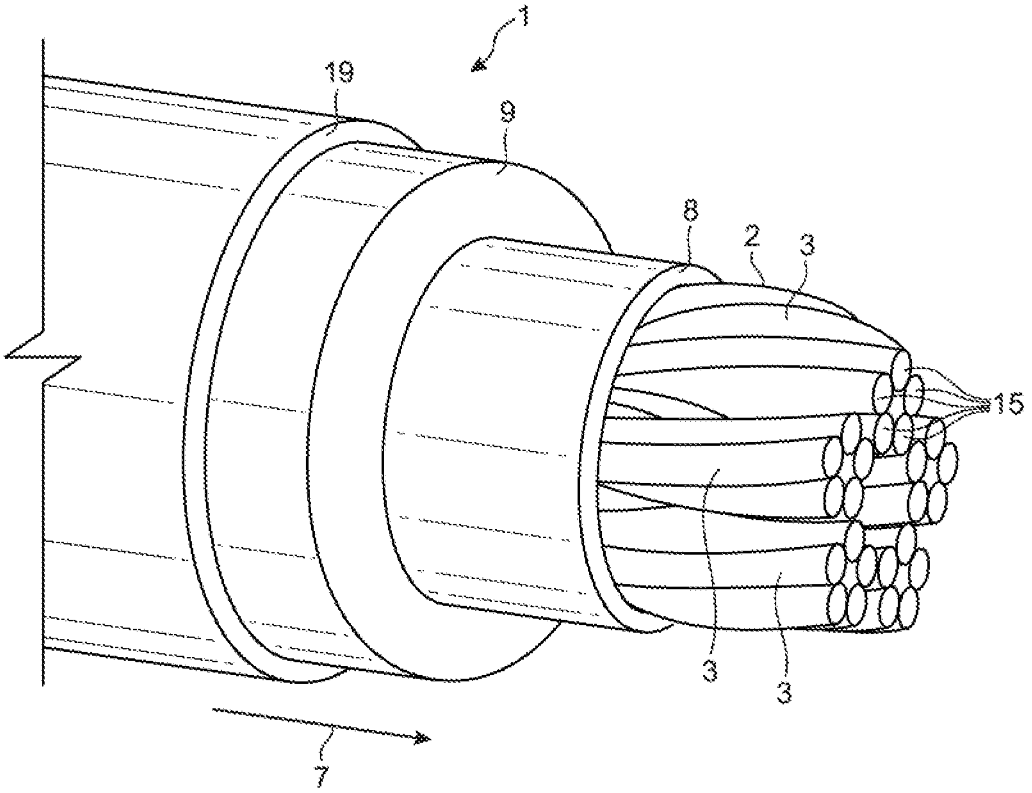
FIG. 8 shows a perspective view of a single-phase cable, which is according to the invention but different to that of FIG. 1 in that it lacks a non-conductive cable core.

Referring to FIG. 8, it should be noted that the central non-conductive cable core 21 is by no means regarded as a necessity in the inventive cables disclosed herein. It may even be the case that the cable core 21 should be omitted to attain the most advantageous embodiments of the invention. This means that the bundle 2 of metallic wires 3 could be disposed essentially as shown in FIG. 1, but without a central non-conductive cable core 21. However, after twisting or weaving of the bundle 2, it is then anticipated that any process of making the bundle 2 more compact (which is common practice) would result in an electrical cable 1 of somewhat different cross-sectional layout of the metallic wires 3 compared to an electrical cable 1 having the central non-conductive cable core 21, although their electrical properties relating to skin and/or proximity effects could be rather similar. Also, it is seen as fully possible for multiple similar non-conductive cores (intermixed among the wires), although not all in a central cable location, to form part of the inventive electrical cable 1.

LIST OF PARTS electrical cable 1;
bundle 2;
metallic wires 3;
non-conductor layers 4;
outer positions 5 (of metallic wires 3 in bundle 2);
inner positions 6 (of metallic wires 3 in bundle 2);
longitudinal extension 7 (of electrical cable 1);
inner semi-conductive layer 8;
insulating layer 9;
electric contact point 10 (between metallic wire 3 and inner semi-conductive layer 8);
lateral positions 11 (of metallic wire 3)
opposed sides 12, 13 (of cross section 2);
center 14 (of bundle 2);
group 15 (of metallic wires 3);
openings 16 (in non-conductor layers 4)
physical interface 17 (between inner surface 18 of inner semi-conductive layer 8 and metallic wires 3)
outer semi-conductive layer 19;
metallic strands 20 (forming metallic wires 3);
central non-conductive core 21 (inside bundle of metallic wires 3);
second electrical cable 22
common protective jacket 23 (of first and second electrical cables);
multi-phase electrical cable 24;
metallic wire diameter 25;
skin depth 26 (of alternating current);
external identifier 27 (of electrical cable indicating operational frequency)
tin plating 28.

The invention claimed is:

1. A single-phase lightweight high-power kilohertz alternating-current high-voltage electrical cable, comprising:
a bundle of metallic wires;
the metallic wires being separated from each other by non-conductor layers provided on at least a majority of individual metallic wires of the bundle;
the metallic wires being woven in a configuration such that each of the metallic wires alternates between outer positions and inner positions in the bundle along a longitudinal extension of the electrical cable to counteract skin effect in the bundle of metallic wires, when in use;
an inner semi-conductive layer of broad range temperature rated polymeric material surrounding the bundle of metallic wires;
an insulating layer of broad range temperature rated polymeric material surrounding and bonded to the inner semi-conductive layer;
at least one of the metallic wires being in electric contact with the inner semi-conductive layer.

2. The electrical cable of claim 1, wherein the configuration is such that each of the metallic wires alternates between lateral positions on opposed sides of the bundle along the longitudinal extension of the electrical cable to enable counteraction of proximity effect.

3. The electrical cable of claim 2, wherein the configuration is such that each of the metallic wires alternates between the lateral positions on opposed sides of a center of the bundle, so as to form a diametrically even distribution of the metallic wires relative to the center of the bundle.

4. The electrical cable of claim 1, wherein:
the bundle is made up of multiple groups of the metallic wires;
the metallic wires of each group are mutually twisted; and
the groups are mutually twisted.

5. The electrical cable of claim 4, wherein at least one of the metallic wires of each of at least two of the multiple groups is in electric contact with the inner semi-conductive layer.

6. The electrical cable of claim 1, wherein the electric contact between at least one of the metallic wires and the inner semi-conductive layer is provided by the non-conductor layers being electrically insulating and exhibiting openings in the non-conductor layers at a physical interface between an inner surface of the inner semi-conductive layer and metallic wires of the bundle.

7. The electrical cable of claim 1, wherein the electric contact between at least one of the metallic wires and the inner semi-conductive layer is provided by the non-conductor layers exhibiting semi-conductive properties at a physical interface between an inner surface of the inner semi-conductive layer and metallic wires of the bundle.

8. The electrical cable of claim 1, wherein the broad range temperature rated polymeric material of the insulating layer is selected from among fluoropolymer, PAEK-family materials, and silicone.

9. The electrical cable of claim 1, wherein the broad range temperature rated polymeric material of the inner semi-conductive layer is selected from among semi-conductivity-prepared fluoropolymer, PAEK-family materials, and silicone.

10. The electrical cable of claim 1, wherein the insulating layer is surrounded by and bonded to an outer semi-conductive layer of broad range temperature rated polymeric material.

11. The electrical cable of claim 10, wherein the outer semi-conductive layer contains the broad range temperature rated polymeric material selected from among fluoropolymer, PAEK-family materials, and silicone.

12. The electrical cable of claim 1, wherein each of the metallic wires is made of copper or aluminum alloy; and
wherein each of the non-conductor layers is made of an insulating material having an additive of non-insulating material.

13. The electrical cable of claim 1, wherein each of the metallic wires is made of aluminum alloy; and
wherein each of the non-conductor layers is made of aluminum oxide.

14. The electrical cable of claim 1, wherein each of the metallic wires is made up of multiple metallic strands.

15. The electrical cable of claim 14, wherein each of the multiple metallic strands is made of copper, or copper alloy, and is plated with a material selected from among tin, silver, and nickel.

16. The electrical cable of claim 1, comprising:

a central non-conductive core inside the bundle of metallic wires.

17. At least a first electrical cable and a second electrical cable, each according to claim 1, and provided within a common protective jacket, constituting a multi-phase electrical cable.

18. The first and the second electrical cables of claim 17, wherein the metallic wires of each of the first and the second electrical cables alternating between lateral positions on opposed sides of the respective bundle, to counteract proximity effect in each one of the first and the second electrical cables, when in use.

19. The electrical cable of claim 1, wherein, when in use, each metallic wire has a diameter less than a factor times a skin depth for the alternating current;

wherein the factor is selected as K/(N^0.25);

wherein 2<K<3; and wherein N is the total number of metallic wires in the bundle.

20. A method for manufacturing an electrical cable according to claim 1, the method comprising:

selecting a wire material for the metallic wires;

selecting an operational frequency of alternating current to be conveyed by the electrical cable;

based on the selected material and the selected operational frequency, selecting a nominal maximum diameter of the metallic wires, when in use, being less than a factor times a skin depth for the alternating current in the metallic wires at the operational frequency for the wire material, the factor being selected as K/(N^0.25), wherein 2<K<3 and N is the total number of metallic wires in the bundle; and preparing the electrical cable.

21. The electrical cable of claim 1, wherein the electric contact between at least one metallic wire and the inner semi-conductive layer is provided in operation by a majority of the non-conductor layers being made of electrically insulating material and exhibiting thicknesses small enough to render larger a first capacitance collectively formed between the majority of the metallic wires and the inner semi-conductive layer than a second capacitance formed between the inner semi-conductive layer and an outside of the insulating layer of the electrical cable.

* * * * *